(12) United States Patent
Ogawa et al.

(10) Patent No.: US 9,699,703 B2
(45) Date of Patent: Jul. 4, 2017

(54) RADIO COMMUNICATION APPARATUS, RADIO COMMUNICATION SYSTEM AND RADIO COMMUNICATION METHOD

(71) Applicant: FUJITSU LIMITED, Kawasaki-shi, Kanagawa (JP)

(72) Inventors: Daisuke Ogawa, Yokosuka (JP); Takashi Dateki, Yokohama (JP); Koji Matsuyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 14/106,270

(22) Filed: Dec. 13, 2013

(65) Prior Publication Data

US 2014/0179262 A1  Jun. 26, 2014

(30) Foreign Application Priority Data

Dec. 20, 2012 (JP) ................ 2012-278736

(51) Int. Cl.
| | |
|---|---|
| *H04W 72/04* | (2009.01) |
| *H04W 24/08* | (2009.01) |
| *H04W 36/30* | (2009.01) |
| *H04L 5/00* | (2006.01) |
| *H04L 1/20* | (2006.01) |

(52) U.S. Cl.
CPC .......... *H04W 36/30* (2013.01); *H04L 1/20* (2013.01); *H04L 5/006* (2013.01); *H04L 5/0046* (2013.01); *H04L 5/0048* (2013.01)

(58) Field of Classification Search
CPC ....... H04L 1/00; H04L 5/0046; H04L 5/0006; H04W 36/30

USPC ..................... 455/67.1, 67.3, 405
See application file for complete search history.

(56) References Cited

U.S. PATENT DOCUMENTS

| | | | |
|---|---|---|---|
| 2003/0169703 A1 | 9/2003 | Tamura | |
| 2010/0279638 A1* | 11/2010 | Lindoff | H04L 25/0204 455/226.1 |
| 2010/0290435 A1* | 11/2010 | Kazmi | H04W 36/30 370/332 |
| 2011/0070888 A1 | 3/2011 | Iwamura et al. | |
| 2011/0116395 A1* | 5/2011 | Tsuda | H04W 28/18 370/252 |
| 2011/0124336 A1 | 5/2011 | Ishii | |
| 2011/0286346 A1* | 11/2011 | Barbieri | H04B 17/327 370/252 |

(Continued)

FOREIGN PATENT DOCUMENTS

| | | |
|---|---|---|
| JP | 2003-259416 A | 9/2003 |
| JP | 2010-268512 A | 11/2010 |

(Continued)

OTHER PUBLICATIONS

3GPP TS36.331 V11.1.0 (Sep. 2012).*
3GPP TS36.133 V11.2.0 (Sep. 2012).*

*Primary Examiner* — William Nealon
(74) *Attorney, Agent, or Firm* — Arent Fox LLP

(57) ABSTRACT

A radio communication apparatus including: an antenna configured to receive a frame including reference signals and including other signals corresponding to radio resources to which channels are mapped, and a processor configured to acquire degree of usage of the radio resource, to calculate a reception quality of the reference signals, and to adjust the reception quality in accordance with the degree.

30 Claims, 17 Drawing Sheets

(56) References Cited

U.S. PATENT DOCUMENTS

| | | | |
|---|---|---|---|
| 2011/0294439 A1* | 12/2011 | Ofuji | H04L 1/0003 455/70 |
| 2012/0115463 A1* | 5/2012 | Weng | H04L 1/0026 455/425 |
| 2012/0157101 A1 | 6/2012 | Uemura et al. | |

FOREIGN PATENT DOCUMENTS

| | | |
|---|---|---|
| JP | 2010-273381 A | 12/2010 |
| JP | 2011-019074 A | 1/2011 |
| JP | 2011-061456 A | 3/2011 |
| JP | 2011-109401 A | 6/2011 |

* cited by examiner

RADIO COMMUNICATION APPARATUS, RADIO COMMUNICATION SYSTEM AND RADIO COMMUNICATION METHOD

CROSS-REFERENCE TO RELATED APPLICATION

This application is based upon and claims the benefit of priority of the prior Japanese Patent Application No. 2012-278736, filed on Dec. 20, 2012, the entire contents of which are incorporated herein by reference.

FIELD

The embodiments discussed herein are related to a radio communication terminal and a cell determination method.

BACKGROUND

There exists a mobile station in which a hand-over condition is set on the basis of the reception quality of signals so that a hand-over condition that is unnecessary is not satisfied and sending of reports to a base station is suppressed (see, for example, Japanese Laid-open Patent Publication No. 2011-19074). There exists another mobile station in which a connection destination cell is selected in accordance with priority information transmitted from a base station (see, for example, Japanese Laid-open Patent Publication No. 2010-268512).

Also, there exists a mobile station in which a connection destination cell is reselected on the basis of the reception quality of signals from a current serving cell and the reception quality of signals from a cell neighboring the current serving cell (see, for example, Japanese Laid-open Patent Publication No. 2010-273381). There exists a technique for balancing a load among frequency bandwidths by reselection of a connection destination cell performed by a mobile station on the basis of an instruction from a base station (see, for example, Japanese Laid-open Patent Publication No. 2011-61456).

Furthermore, there exists a mobile station that transmits to a base station information on the reception quality of signals measured at the mobile station and location information of the mobile station, receives from the base station quality information on each of cells corresponding to the location information of the mobile station, and selects a connection destination cell from among the cells on the basis of the received quality information (see, for example, Japanese Laid-open Patent Publication No. 2011-109401). There exists another mobile station that recognizes the mobile state of the mobile station on the basis of the reception quality of signals and variably controls a condition for determining whether a cell is valid as a connection destination in accordance with the mobile state of the mobile station (see, for example, Japanese Laid-open Patent Publication No. 2003-259416).

SUMMARY

According to an aspect of the invention, a radio communication apparatus includes: an antenna configured to receive a frame including reference signals and including other signals corresponding to radio resources to which channels are mapped, and a processor configured to acquire degree of usage of the radio resource, to calculate a reception quality of the reference signals, and to adjust the reception quality in accordance with the degree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
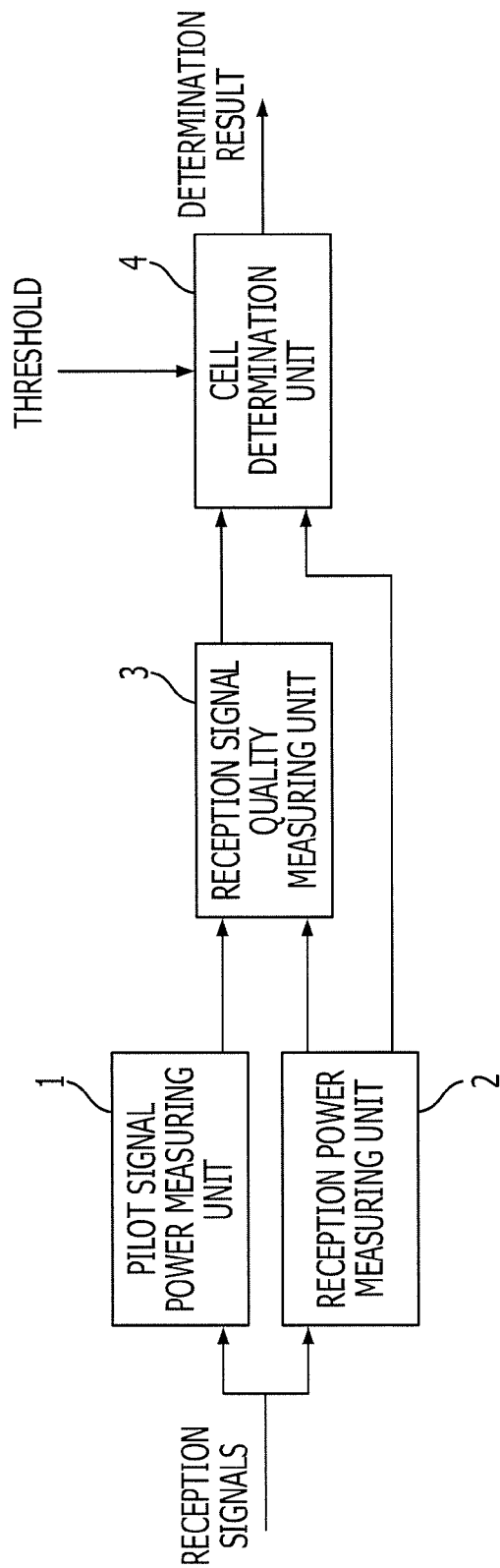
FIG. 1 is a diagram illustrating an example of a block that performs cell determination in a mobile communication terminal according to an embodiment.

An existing mobile station may falsely detect in a cell search a cell that is not present due to noise or the like. Such a falsely detected cell will not become a target connection destination of the mobile station. Therefore, the mobile station does not have to measure the reception quality of signals from the falsely detected cell and report the measurement result to a base station. However, the existing mobile station measures the reception quality of signals from the falsely detected cell and reports the measurement result to the base station. Accordingly, radio resources of the uplink from the mobile station to the base station are wastefully used, which has been problematic.

In these embodiments, there are provided a mobile communication terminal and a cell determination method in which such wasteful use of radio resources of the uplink may be suppressed.

Referring to the accompanying drawings, preferred embodiments of the mobile communication terminal and cell determination method are described below in detail. In the following description of the embodiments, like reference numerals and characters are given to similar constituent elements and duplicated description thereof is omitted.

Example of Block Performing Cell Determination in Mobile Communication Terminal

FIG. 1 is a diagram illustrating an example of a block that performs cell determination in a mobile communication terminal according to an embodiment. As illustrated in FIG. 1, the block in the mobile communication terminal, which performs cell determination, includes a pilot signal power measuring unit 1, a reception power measuring unit 2, a reception signal quality measuring unit 3, and a cell determination unit 4 using a threshold. The threshold is set in advance in the mobile communication terminal.

The pilot signal power measuring unit 1 measures the power of pilot signals among reception signals. The reception power measuring unit 2 measures the reception power of the reception signals. The reception power measuring unit 2 measures the power of first subcarriers in which the pilot signals among the reception signals are arranged. The reception power measuring unit 2 also measures the power of second subcarriers in which signals other than the pilot signals among the reception signals are arranged. The power of second subcarriers corresponds to degree of usage of second subcarriers.

The reception signal quality measuring unit 3 measures the quality of the reception signals, which is reception quality, on the basis of the measured value of the power of the pilot signals and the measured value of the reception power of the reception signals. The cell determination unit 4 may correct the threshold on the basis of the measured value of the power of the first subcarriers and the measured value of the power of the second subcarriers. The cell determination unit 4 may then compare the measured value of the reception quality with the corrected threshold and determine whether a cell presumed to correspond to the reception signals is valid or invalid.

Alternatively, the cell determination unit 4 may correct the measured value of the reception quality on the basis of the measured value of the power of the first subcarriers and the measured value of the power of the second subcarriers. The cell determination unit 4 may then compare the corrected measured value of the reception quality with the threshold and determine whether the cell presumed to correspond to the reception signals is valid or invalid.

The pilot signal power measuring unit 1, the reception power measuring unit 2, the reception signal quality measuring unit 3, or the cell determination unit 4 may be implemented by a dedicated digital circuit, for example, which performs the operations of these units. The pilot signal power measuring unit 1, the reception power measuring unit 2, the reception signal quality measuring unit 3, or the cell determination unit 4 may be implemented by, for example, causing a processor to execute a program that implements a cell determination method described below. Examples of such a processor include a central processing unit (CPU) and a digital signal processor (DSP).

An issue occurring when the threshold or the measured value of the reception quality is not corrected is now described.

Suppose that a mobile communication terminal detects by performing a cell search a first cell that is present and a second cell that is not present, for example. In such a case, an arrangement pattern of pilot signals among signals transmitted from the first cell may be the same as an arrangement pattern of pilot signals among signals transmitted from the second cell. If this is the case, the mobile communication terminal uses the pilot signals among the signals transmitted from the first cell to measure the reception quality of the signals transmitted from the second cell.

A threshold may be set in a full-load case where data is mapped to all subcarriers for signals transmitted from a cell, for example. In the case where signals transmitted from a determination target cell are signals of the full-load case, the mobile communication terminal may correctly determine that the determination target cell is a valid cell when the measured value of the reception quality of signals transmitted from the determination target cell is greater than the threshold, and that the determination target cell is an invalid cell when the measured value of the reception quality is not greater than the threshold.

However, the signals transmitted from the determination target cell may be signals of a discontinuous transmission (DTX) case where mapping of minimum data in a system, such as control signals, is performed. The measured value of the reception quality of signals of the DTX case is greater than the measured value of the reception quality of signals of the full-load case. Accordingly, the measured value of the reception quality of signals of the DTX case may exceed the threshold that is set for the full-load case.

Suppose that the threshold is not corrected in the case described above. When the mobile communication terminal receives signals of the DTX case and determines validity of the second cell on the basis of the measured value of the reception quality of the reception signals, the mobile communication terminal falsely determines that the second cell that is not present is a valid cell that is present. This is not limited to the DTX case and the same also occurs in the case where the mobile communication terminal receives signals other than those of the full-load case. The false determination also occurs when correction of the measured value of the reception quality, which is an alternative to correction of the threshold, is not performed. The mobile communication terminal then reports to a base station the measurement result of the reception quality of the second cell that is not present. Consequently, radio resources of the uplink to the base station are wastefully used.

The same is true when a threshold is set for the DTX case and validity of a cell is determined on the basis of the measured value of the reception quality of signals of the full-load case. In this case, the measured value of the reception quality of signals of the full-load case is less than the measured value of the reception quality of signals of the DTX case. Accordingly, the measured value of the reception quality of signals of the full-load case is not greater than the threshold set for the DTX case, resulting in false determination. This is not limited to the full-load case, and the same occurs in the case where the mobile communication terminal receives signals other than those of the DTX case.

In the mobile communication terminal illustrated in FIG. 1, the threshold or the measured value of the reception quality is corrected on the basis of the measured value of the power of the first subcarriers in which the pilot signals are arranged and the measured value of the power of the second subcarriers in which signals other than the pilot signals are arranged. As a result, when a threshold is set for the full-load case, the measured value of the reception quality of signals other than those of the full-load case is controlled to be no greater than the threshold and therefore false determination in which a cell that is not present is falsely determined to be a valid cell is suppressed. Furthermore, when a threshold is set for the DTX case, the measured value of the reception quality of signals other than those of the DTX case is controlled to be greater than the threshold and therefore false determination in which a cell that is not present is falsely determined to be a valid cell is suppressed. Therefore, reporting of the measurement result of the reception quality relating to a cell that is not present to a base station is suppressed, which may reduce wasteful use of radio resources of the uplink.

First Example of Cell Determination Method

Figure 2:
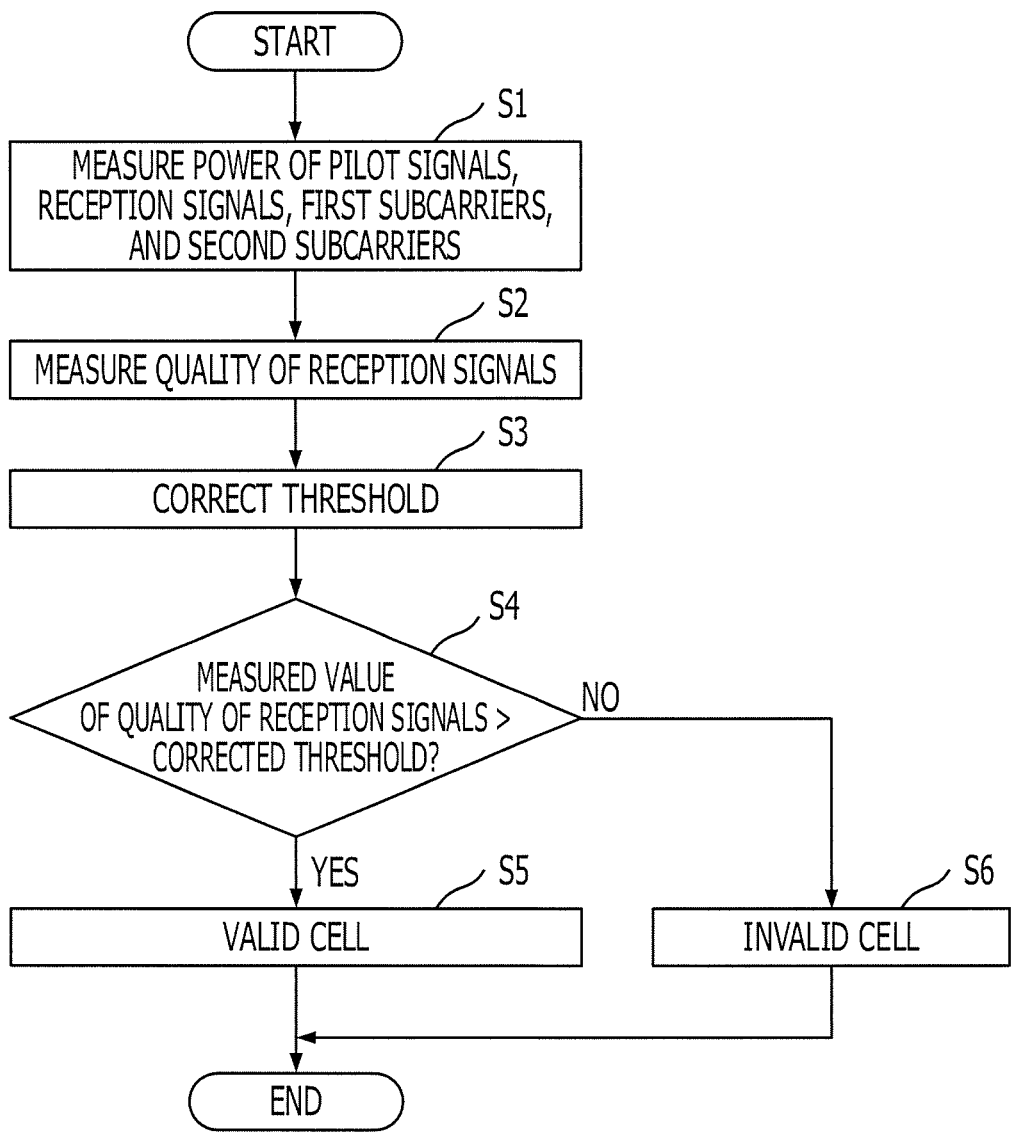
FIG. 2 is a flowchart illustrating a first example of a cell determination method according to an embodiment.

FIG. 2 is a flowchart illustrating a first example of a cell determination method according to an embodiment. The cell determination method illustrated in FIG. 2 may be implemented by, for example, the mobile communication terminal illustrated in FIG. 1. This embodiment is described below while supposing that the cell determination method illustrated in FIG. 2 is implemented by the mobile communication terminal illustrated in FIG. 1.

As illustrated in FIG. 2, when the cell determination method is started by the mobile communication terminal illustrated in FIG. 1, the mobile communication terminal first causes the pilot signal power measuring unit 1 to measure the power of pilot signals among reception signals from a cell detected by performing a cell search. The mobile communication terminal also causes the reception power measuring unit 2 to measure the reception power of the reception signals, the power of first subcarriers in which the pilot signals among the reception signals are arranged, and the power of second subcarriers in which signals other than the pilot signals among the reception signals are arranged (S1). The power of second subcarriers corresponds to degree of usage of second subcarriers.

Next, the mobile communication terminal causes the reception signal quality measuring unit 3 to measure the quality of the reception signals on the basis of the measured value of the power of the pilot signals and the measured value of the reception power of the reception signals (S2). Then, the mobile communication terminal causes, for example, the cell determination unit 4 to correct a threshold set in advance on the basis of the measured value of the power of the first subcarriers and the measured value of the power of the second subcarriers (S3). Note that S2 may be executed first, S3 may be executed first, or S2 and S3 may be executed concurrently.

Next, the mobile communication terminal causes, for example, the cell determination unit 4 to compare the measured value of the quality of the reception signals with the corrected threshold and determine whether the measured value of the quality of the reception signals is greater than the corrected threshold (S4). If the measured value of the quality of the reception signals is greater than the corrected threshold (Yes in S4), the mobile communication terminal causes the cell determination unit 4 to determine that the cell detected by the cell search is valid (S5).

On the other hand, if the measured value of the quality of the reception signals is not greater than the corrected threshold (No in S4), the mobile communication terminal causes the cell determination unit 4 to determine that the cell detected by the cell search is invalid (S6). When the cell determination is finished, the series of processes of the cell determination method is terminated.

Note that, in S3, the mobile communication terminal may cause, for example, the cell determination unit 4 to correct the measured value of the reception quality on the basis of the measured value of the power of the first subcarriers and the measured value of the power of the second subcarriers. In this case, in S4, the mobile communication terminal may cause the cell determination unit 4 to compare the corrected measured value of the reception quality with the threshold and determine whether the cell detected by the cell search is valid or invalid (S5 and S6).

In the cell determination method illustrated in FIG. 2, the threshold or the measured value of the reception quality is corrected on the basis of the measured value of the power of the first subcarriers in which the pilot signals are arranged and the measured value of the power of the second subcarriers in which signals other than the pilot signals are arranged. As a result, as in the mobile communication terminal illustrated in FIG. 1, false determination in which a cell that is not present is falsely determined to be a valid cell is suppressed. Therefore, reporting of the measurement result of the reception quality relating to a cell that is not present to a base station is suppressed, which may reduce wasteful use of radio resources of the uplink.

Example of Application to LTE System

Examples of application of the mobile communication terminal illustrated in FIG. 1 and the cell determination method illustrated in FIG. 2 include application to a Long Term Evolution (LTE) system. An example of application to an LTE system is described below.

In the LTE system, the mobile communication terminal measures reference signal received power (RSRP) and reference signal received quality (RSRQ) for a cell detected by performing a cell search. A reference signal (RS) is a known signal and one example of the pilot signal. RSRP is one example of the power. RSRQ is one example of the quality of reception signals.

The radio access system of the downlink of the LTE system is based on orthogonal frequency division multiplexing (OFDM).

Figure 3:
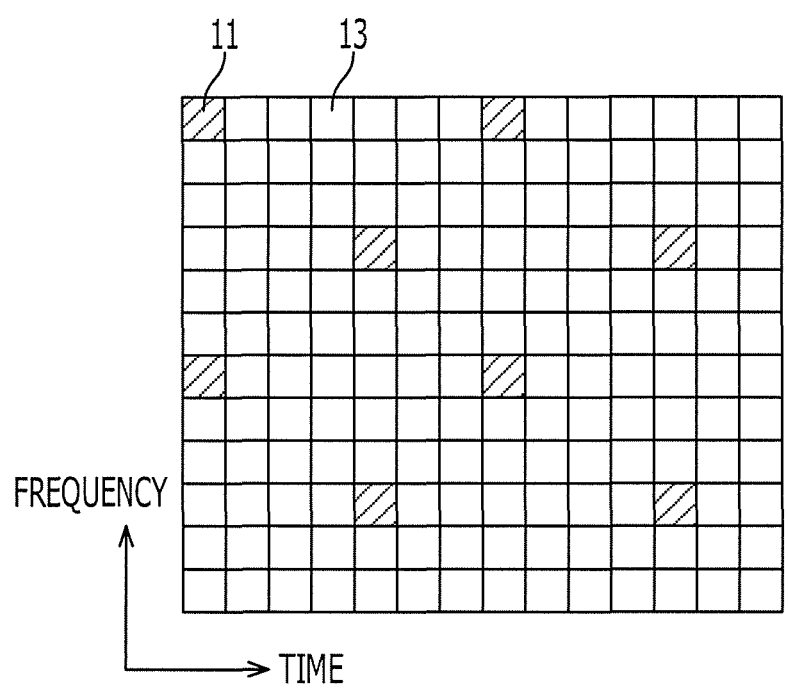
FIG. 3 is a diagram illustrating a mapping pattern of OFDM signals in two dimensions of time and a frequency domain.
Figure 4:
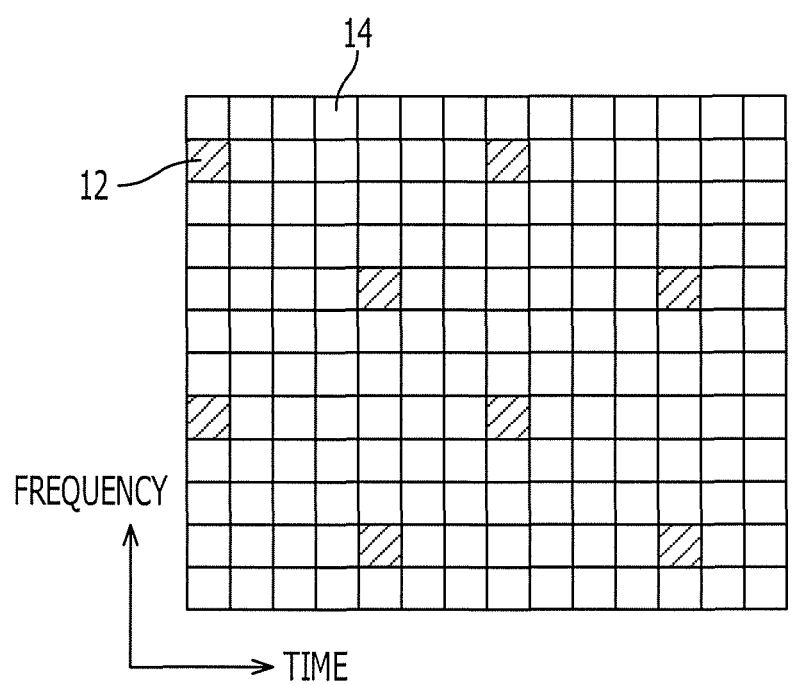
FIG. 4 is a diagram illustrating another mapping pattern of OFDM signals in two dimensions of time and a frequency domain.

FIG. 3 is a diagram illustrating a mapping pattern of OFDM signals in two dimensions of time and a frequency domain. FIG. 4 is a diagram illustrating another mapping pattern of OFDM signals in two dimensions of time and a frequency domain.

In FIGS. 3 and 4, each small square represents a resource element (RE). In FIGS. 3 and 4, RSs are mapped to REs 11 and REs 12, which are the hatched parts. In FIGS. 3 and 4, signals other than RSs, such as data signals, are mapped to REs 13 and REs 14, which are the non-hatched parts. A pattern sequence of RSs is specific to a base station related to the RSs. Therefore, the mobile communication terminal uses an RS sequence related to a base station, on which the mobile communication terminal is to perform measurement, to measure RSRP and RSRQ.

Figure 5:
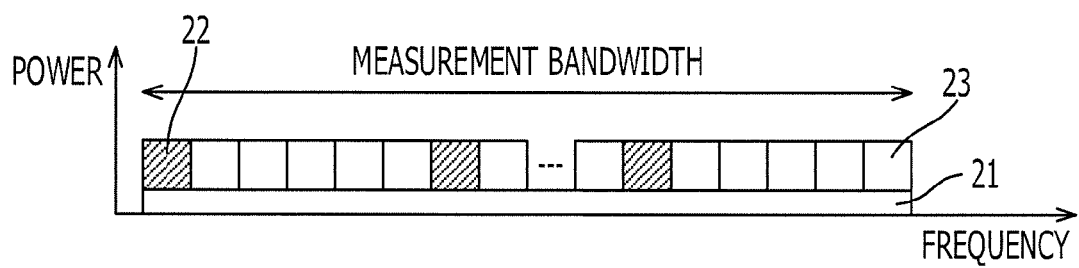
FIG. 5 is a diagram illustrating a power distribution of signals in a frequency domain in one OFDM symbol in a full-load case.
Figure 6:
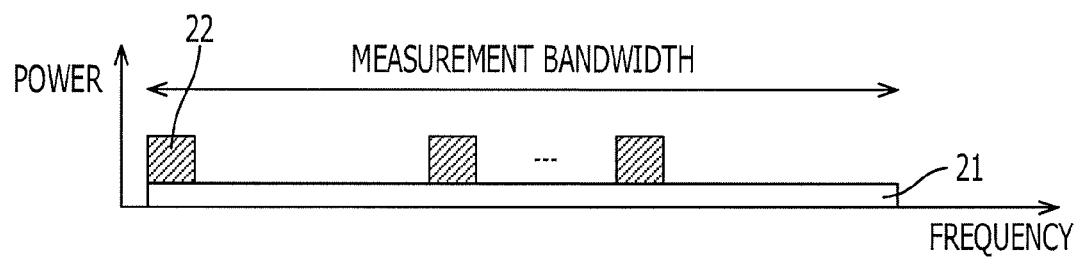
FIG. 6 is a diagram illustrating a power distribution of signals in a frequency domain in one OFDM symbol in a DTX case.

FIG. 5 is a diagram illustrating a power distribution of signals in a frequency domain in one OFDM symbol in the full-load case. FIG. 6 is a diagram illustrating a power distribution of signals in a frequency domain in one OFDM symbol in the DTX case. The signal sequences illustrated in FIGS. 5 and 6, as examples, each correspond to a sequence on the left end of the mapping pattern of OFDM signals illustrated in FIG. 3, for example, that is, a sequence at time 0.

In FIGS. 5 and 6, the power level extending over the measurement bandwidth is a power level 21 caused by noise.

The power levels that are the hatched parts on the power level 21 caused by noise are power levels 22 which are power levels of the REs 11 to which RSs are mapped. The power levels that are the non-hatched parts on the power level 21 caused by noise are power levels 23 which are power levels of the REs 13 to which signals other than RSs are mapped. In the DTX case, data is not mapped to the REs 13 to which signals other than RSs are mapped and therefore the total power includes the power level 21 caused by noise and the power levels 22 which are power levels of the REs 11 to which RSs are mapped.

RSRP is an average of one power level 22 which is a power level of an RE 11 to which an RS is mapped. RSRQ is calculated from RSRP and received signal strength indicator (RSSI). RSSI represents the total reception power of a measurement bandwidth and is one example of the reception power of reception signals. Taking FIG. 5 as an example, RSSI equals the total area of the power level 21 caused by noise, the power levels 22 which are power levels of the RE 11s to which RSs are mapped, and the power levels 23 which are power levels of the REs 13 to which signals other than RSs are mapped.

In the 3rd Generation Partnership Project (3GPP), RSRQ is defined by Equation (1) below, where N is the number of resource blocks (RBs) in the measurement bandwidth.

$$RSRQ = \frac{RSRP \times N}{RSSI} \quad (1)$$

In LTE-Advanced which is an advanced version of LTE, an inter-cell interference control technique called enhanced Inter-Cell Interference Coordination (eICIC) is adopted.

Figure 7:
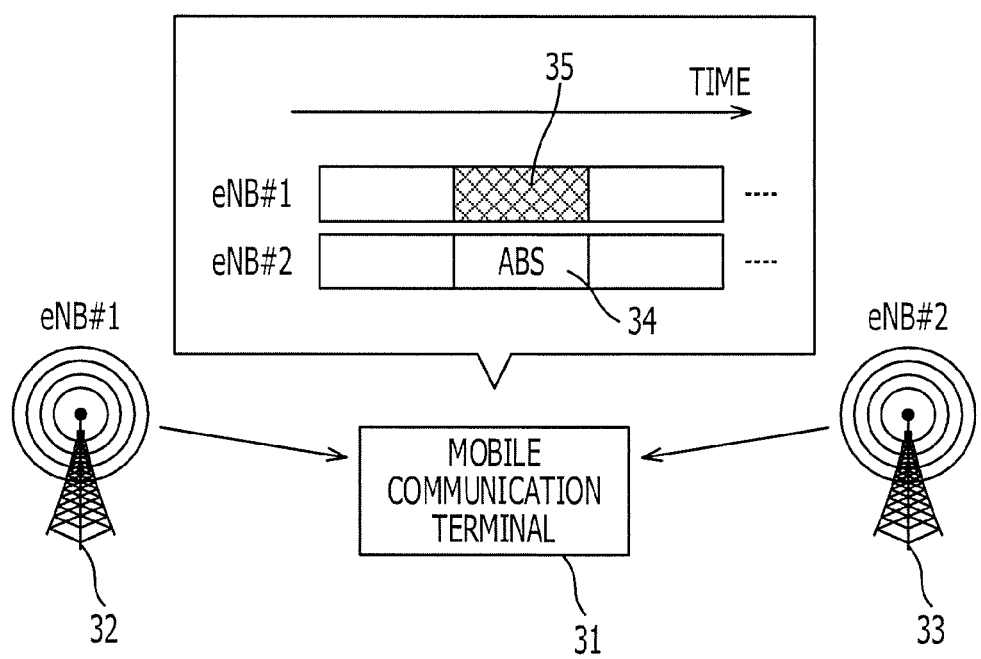
FIG. 7 is a diagram illustrating eICIC.

FIG. 7 is a diagram illustrating eICIC. As illustrated in FIG. 7, when a mobile communication terminal 31 communicates with a first eNode B (eNB#1) 32, signals for another mobile communication terminal, which are transmitted from a second eNode B (eNB#2) 33 in a neighboring cell, cause interference. As a result of adopting eICIC, however, the second eNode B 33 does not transmit signals in a certain time period and therefore interference affecting the mobile communication terminal 31 that communicates with the first eNode B 32 is reduced.

In LTE-Advanced, subframes called almost blank subframes (ABSs) are available. Signals that cause interference are rarely transmitted in ABSs. When the second eNode B 33 uses ABSs, interference affecting the mobile communication terminal 31 that communicates with the first eNode B 32 is reduced. In a subframe 34 that is set as an ABS in the second eNode B 33, the mobile communication terminal 31 measures RSRP and RSRQ on the basis of RSs included in a subframe 35, the hatched part in FIG. 7, of the first eNode B 32.

Suppose that the mapping pattern of OFDM signals in the first eNode B 32 is the pattern illustrated in FIG. 3 and the mapping pattern of OFDM signals in the second eNode B 33 is the pattern illustrated in FIG. 4, for example. Furthermore, suppose that the mapping pattern of OFDM signals in the second eNode B 33, which is illustrated in FIG. 4, is a pattern of subframes that are set as ABSs.

In subframes set as ABSs, RSs are mapped to the REs 12 to which RSs are mapped, and the REs 14 to which signals other than RSs are mapped become null REs to which no data is mapped. Accordingly, in subframes set as ABSs, only control signals such as RSs are transmitted.

In this case, the power of signals that the mobile communication terminal 31 receives from the first eNode B 32 is low while the power of signals received from the second eNode B 33 that causes interference is high. Therefore, for composite signals caused by the first eNode B 32 and the second eNode B 33, which the mobile communication terminal 31 actually receives, the power levels of the REs 12 to which RSs from the second eNode B 33 are mapped become high.

Figure 8:
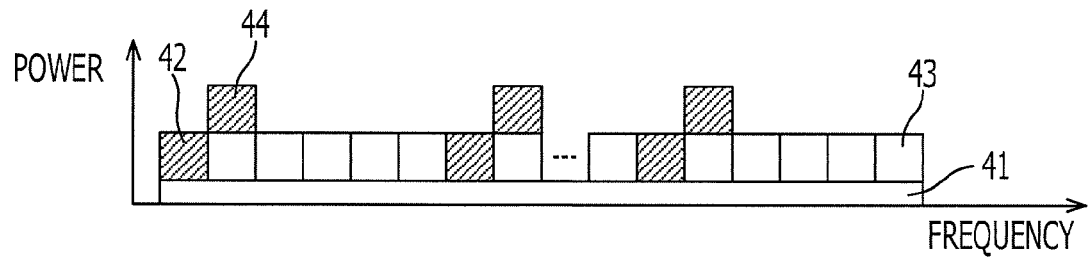
FIG. 8 is a diagram illustrating a power distribution of composite signals in a frequency domain in one OFDM symbol in eICIC.

FIG. 8 is a diagram illustrating a power distribution of composite signals in a frequency domain in one OFDM symbol in eICIC. The signal sequence illustrated in FIG. 8, for example, corresponds to a sequence on the left end of the mapping pattern of OFDM signals illustrated in FIG. 3 and that in FIG. 4, that is, a sequence at time 0.

As illustrated in FIG. 8, the power distribution of composite signals that the mobile communication terminal 31 actually receives is such that the power distribution includes a power level 41 caused by noise, which extends over the measurement bandwidth, and power levels 42 which are power levels of RSs from the first eNode B 32 and power levels 43 which are power levels of signals other than RSs from the first eNode B 32, which are added to the power level 41. Furthermore, the power distribution of composite signals is such that the power distribution includes power levels 44 which are power levels of RSs from the second eNode B 33, which are added to the power levels 42 and 43 which are power levels of signals from the first eNode B 32.

Suppose that the power levels 44 which are power levels of RSs from the second eNode B 33 in FIG. 8 correspond to the power levels 22 which are power levels of the REs 11 to which RSs are mapped in FIG. 6, and the power level 41 caused by noise and the power levels 42 which are power levels of RSs from the first eNode B 32 in FIG. 8 correspond to the power level 21 caused by noise in FIG. 6. Then, the power distribution illustrated in FIG. 8 is similar to the power distribution in the DTX case illustrated in FIG. 6. Therefore, in the embodiments described below, suppose that the DTX case includes the case illustrated in FIG. 8 where ABSs in eICIC are adopted.

Example of Receiver in Mobile Communication Terminal

Figure 9:
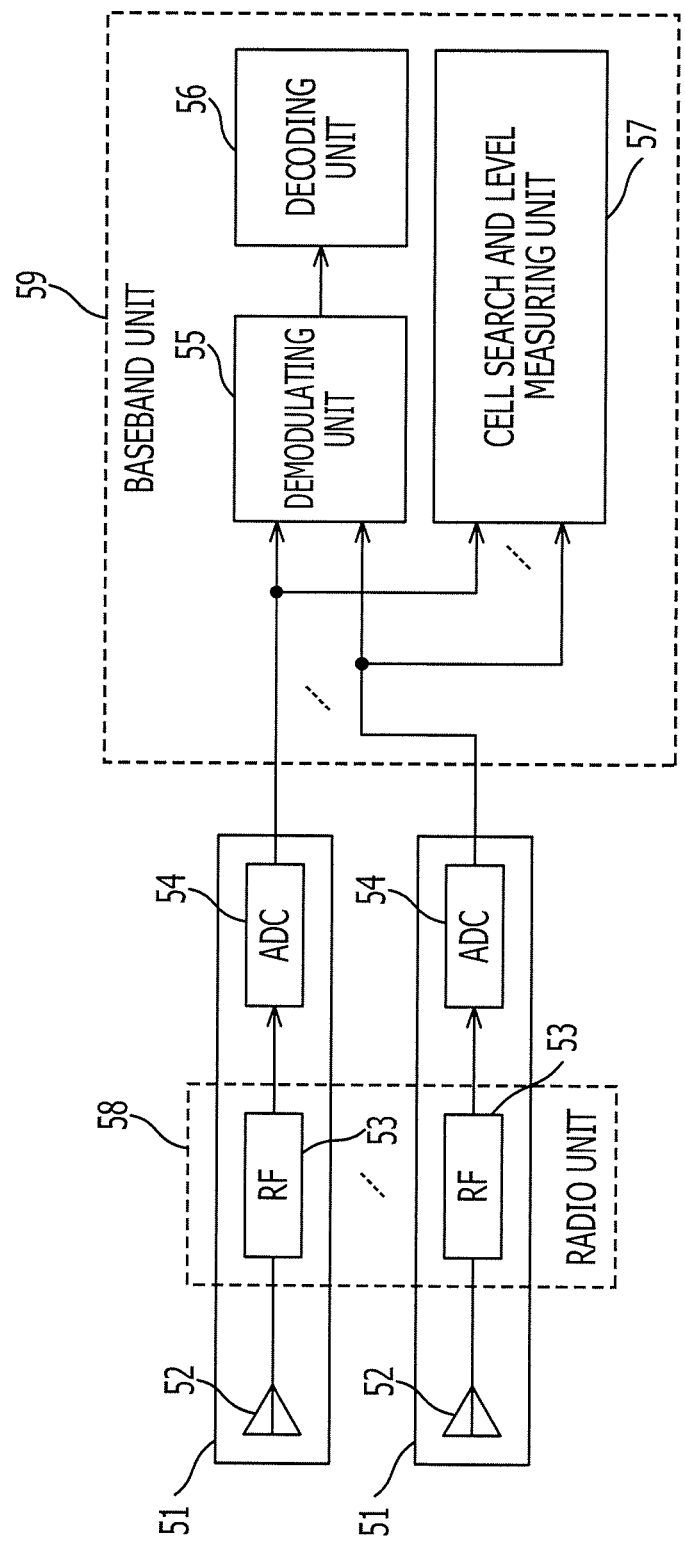
FIG. 9 is a diagram illustrating an example of a receiver in the mobile communication terminal according to an embodiment.

FIG. 9 is a diagram illustrating an example of a receiver in the mobile communication terminal according to an embodiment. As illustrated in FIG. 9, the receiver in the mobile communication terminal may have a plurality of receiver blocks 51. Each receiver block 51 has an antenna 52, radio frequency (RF) unit 53, and an analog-to-digital converter (ADC) 54.

In each receiver block 51, the RF unit 53 is connected to the antenna 52, and the ADC 54 is connected to the RF unit 53. The RF unit 53 receives signals of a desired frequency band among radio signals received by the antenna 51. The RF unit 53 down-converts the signals of a desired frequency band. The ADC 54 converts the signals of a desired frequency band outputted from the RF unit 53 to signals of a digital baseband.

The receiver further has a demodulating unit 55, a decoding unit 56, and a cell search and level measuring unit 57. The demodulating unit 55 is connected to each ADC 54 in each receiver block 51. The demodulating unit 55 demodulates the signals of a digital baseband outputted from each ADC 54. The decoding unit 56 is connected to the demodulating unit 55. The decoding unit 56 decodes the signals outputted from the demodulating unit 55.

The cell search and level measuring unit 57 is connected to each ADC 54 in each receiver block 51. The cell search and level measuring unit 57 uses the signals of a digital baseband outputted from each ADC 54 to perform a cell search. The cell search and level measuring unit 57 measures the reception quality relating to cells detected by the cell search and determines whether each cell is valid or invalid.

The RF units 53 of the receiver blocks 51 surrounded by the dashed line as a radio unit 58 in FIG. 9 may be implemented by an analog circuit, for example. The demodulating unit 55, the decoding unit 56, and the cell search and level measuring unit 57 surrounded by the dashed line as a baseband unit 59 may be implemented by a digital circuit, for example, or by causing a processor to execute a program that implements a cell determination method described below. Examples of such a processor include a CPU and a DSP.

Example of Cell Search and Level Measuring Unit

Figure 10:
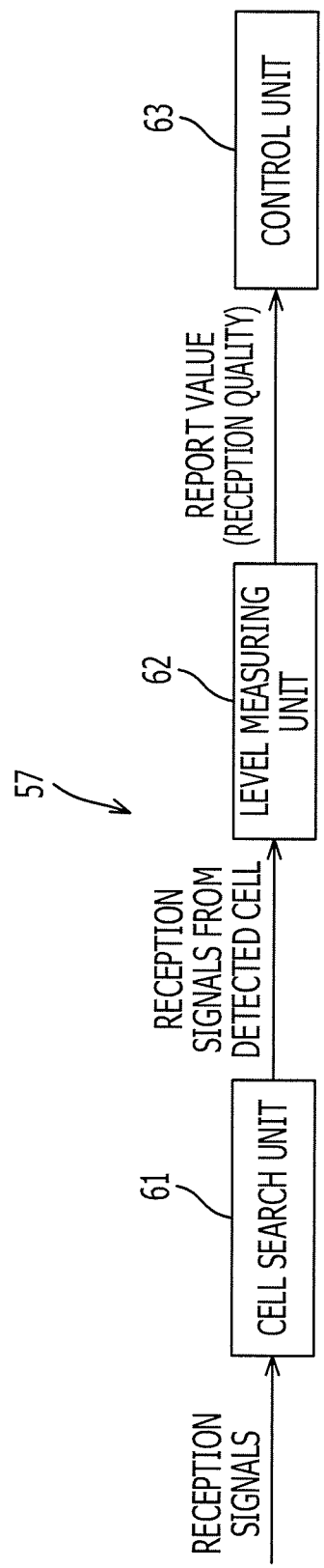
FIG. 10 is a diagram illustrating an example of a cell search and level measurement unit in the mobile communication terminal according to the embodiment.

FIG. 10 is a diagram illustrating an example of the cell search and level measurement unit in the mobile communication terminal according to the embodiment. As illustrated in FIG. 10, the cell search and level measurement unit 57 has a cell search unit 61, a level measuring unit 62, and a control unit 63.

The cell search unit 61 is connected to each ADC 54 in each receiver block 51. The cell search unit 61 detects base stations in a plurality of cells including neighboring cells. The cell search unit 61 may detect information such as reception frame timing or a cell ID of each cell.

The level measuring unit 62 is connected to the cell search unit 61. The level measuring unit 62 measures the reception quality relating to each cell on the basis of information such as reception frame timing or a cell ID, which is detected by a cell search performed by the cell search unit 61.

The control unit 63 is connected to the level measuring unit 62. The control unit 63 determines whether or not handover to a cell other than a current serving cell is to be performed on the basis of the measured value of the reception quality relating to each cell outputted from the level measuring unit 62. The control unit 63 also performs control for reporting the result of measurement of the reception quality to a base station.

Example of Level Measuring Unit

Figure 11:
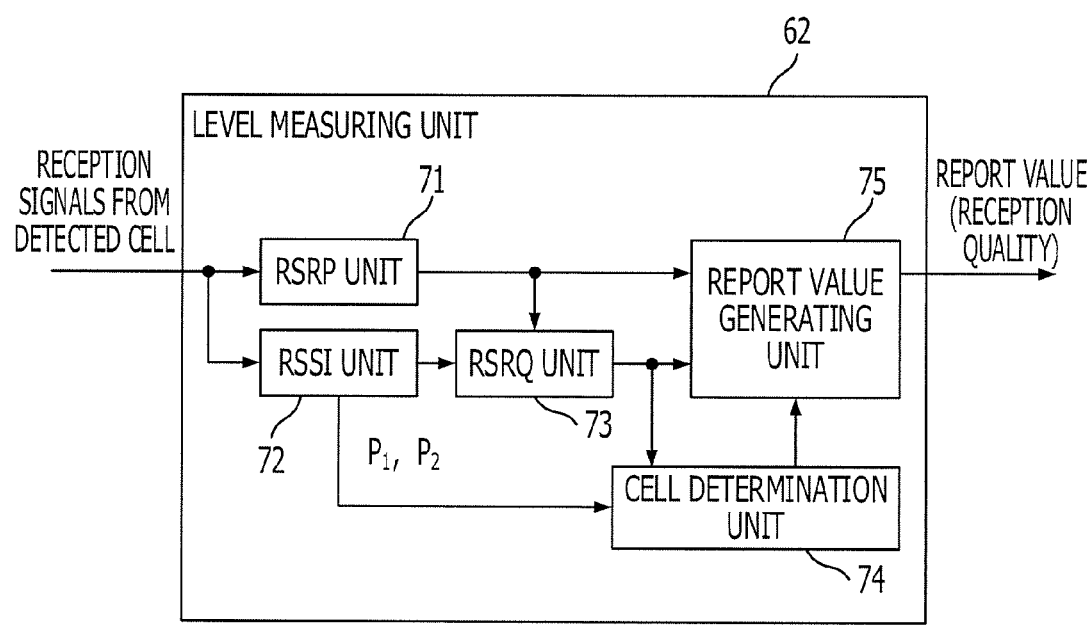
FIG. 11 is a diagram illustrating an example of a level measurement unit in the mobile communication terminal according to the embodiment.

FIG. 11 is a diagram illustrating an example of the level measuring unit in the mobile communication terminal according to the embodiment. As illustrated in FIG. 11, the level measuring unit 62 may have an RSRP unit 71, an RSSI unit 72, an RSRQ unit 73, a cell determination unit 74, and a report value generating unit 75. A threshold may be set in the cell determination unit 74. The threshold may be set for the full-load case or for the DTX case. This embodiment is described below while supposing that a threshold is set for the full-load case.

The RSRP unit 71 is connected to the cell search unit 61. The RSRP unit 71 measures RSRP on the basis of reception signals from a cell detected by a cell search performed by the cell search unit 61. The RSRP unit 71 is one example of the pilot signal power measuring unit. An example of the RSRP unit 71 is illustrated in FIG. 12.

Figure 12:
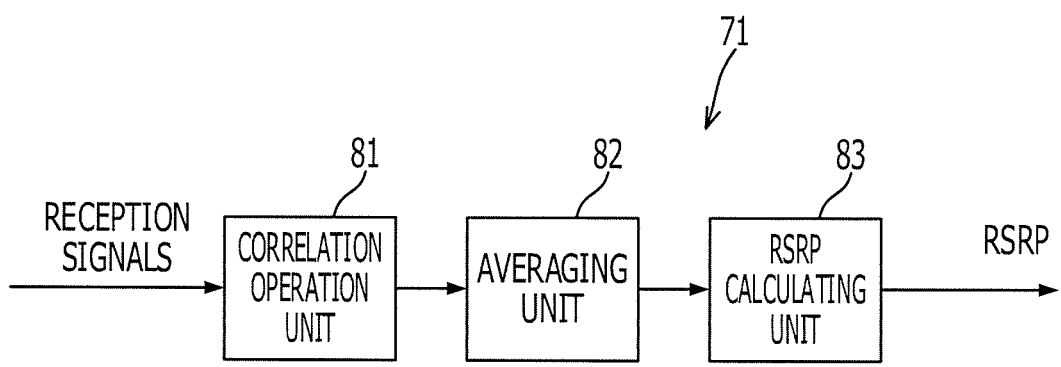
FIG. 12 is a diagram illustrating an example of an RSRP unit in the mobile communication terminal according to the embodiment.

FIG. 12 is a diagram illustrating an example of the RSRP unit in the mobile communication terminal according to the embodiment. As illustrated in FIG. 12, the RSRP unit 71 has a correlation operation unit 81, an averaging unit 82, and an RSRP calculating unit 83.

The correlation operation unit 81 is connected to the cell search unit 61. The correlation operation unit 81 uses an RS sequence of a base station corresponding to a cell ID obtained by a cell search to perform a correlation operation for reception signals from the cell detected by the cell search performed by the cell search unit 61.

The averaging unit 82 is connected to the correlation operation unit 81. As illustrated in FIG. 3 or 4, RSs are transmitted from a base station at corresponding points in time. The averaging unit 82 averages the correlation operation results obtained from the correlation operation unit 81 at these points in time. As a result, accuracy of presumptions made by the correlation operation is increased.

The RSRP calculating unit 83 is connected to the averaging unit 82. The RSRP calculating unit 83 calculates RSRP on the basis of the averaged correlation operation result outputted from the averaging unit 82.

In FIG. 11, the RSSI unit 72 is connected to the cell search unit 61. The RSSI unit 72 measures RSSI on the basis of the reception signals from the cell detected by a cell search performed by the cell search unit 61. The RSSI unit 72 measures power $P_1$ which is a power level of an RE to which an RS among reception signals from the cell detected by a cell search performed by the cell search unit 61 is mapped. This RE to which an RS is mapped corresponds to the first subcarrier.

The RSSI unit 72 measures power $P_2$ which is a power level of an RE to which a signal which is not an RS among the reception signals from the cell detected by a cell search performed by the cell search unit 61 is mapped. This RE to which a signal which is not an RS is mapped corresponds to the second subcarrier. The RSSI unit 72 is one example of the reception power measuring unit. An example of the RSSI unit 72 is illustrated in FIG. 13.

Figure 13:
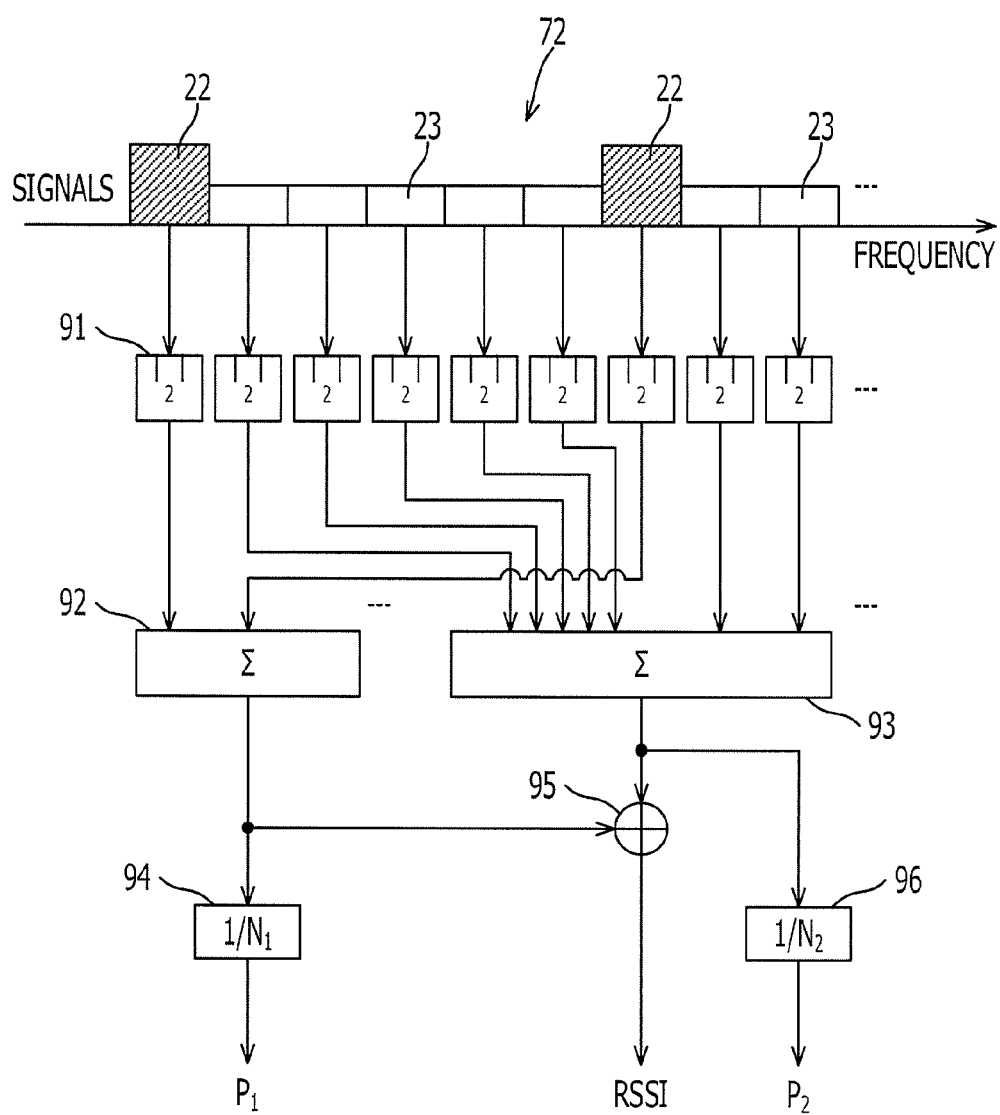
FIG. 13 is a diagram illustrating a first example of an RSSI unit in the mobile communication terminal according to the embodiment.

FIG. 13 is a diagram illustrating a first example of the RSSI unit in the mobile communication terminal according to the embodiment. As illustrated in FIG. 13, the RSSI unit 72 has a plurality of complex operation units 91, a first Σ operation unit 92, a second Σ operation unit 93, a $1/N_1$ operation unit 94, an addition unit 95, and a $1/N_2$ operation unit 96. The RSSI unit 72 receives signals of a frequency domain.

In FIG. 13, each complex operation unit 91 is represented by "$\|\ \|^2$". The first Σ operation unit 92 and the second Σ operation unit 93 are each represented by "Σ". The $1/N_1$ operation unit 94 and the $1/N_2$ operation unit 96 are represented by "$1/N_1$" and "$1/N_2$" respectively.

Each complex operation unit 91 is connected to the cell search unit 61. Each complex operation unit 91 calculates the square of the absolute value of a complex signal corresponding thereto among the signals of a frequency domain received.

The first Σ operation unit 92 is connected to the complex operation units 91 corresponding to REs to which RSs are mapped. The positions of REs to which RSs are mapped are identified by the cell ID reported from the cell search unit 61. The first Σ operation unit 92 calculates the sum total of the power levels 22 which are power levels of REs to which RSs are mapped.

The second Σ operation unit 93 is connected to the complex operation units 91 corresponding to REs to which signals other than RSs are mapped. The second Σ operation unit 93 calculates the sum total of the power levels 23 which are power levels of REs to which signals other than RSs are mapped.

Note that REs to which signals other than RSs are mapped may be delimited by successive REs to which RSs are mapped to form a group, the sum of the power levels 23 which are power levels of REs to which signals other than RSs are mapped is calculated for each group of REs to which signals other than RSs are mapped, and the sum total of the power levels of groups may be calculated. In an LTE system, for example, five consecutive REs to which signals other than RSs are mapped exist between two successive REs to which RSs are mapped. Therefore, the five REs between the two successive REs to which RSs are mapped form one group.

The $1/N_1$ operation unit 94 is connected to the first $\Sigma$ operation unit 92. The $1/N_1$ operation unit 94 divides the sum total of the power levels 22 which are power levels of REs to which RSs are mapped, which is outputted from the first $\Sigma$ operation unit 92, by $N_1$ which is the number of REs to which RSs are mapped, to obtain the power $P_1$ which is a power level of an RE to which an RS is mapped. That is, the power $P_1$ which is a power level of an RE to which an RS is mapped is an average of the power levels of a plurality of REs to which RSs are mapped.

The $1/N_2$ operation unit 96 is connected to the second $\Sigma$ operation unit 93. The $1/N_2$ operation unit 96 divides the sum total of the power levels 23 which are power levels of REs to which signals other than RSs are mapped, which is outputted from the second $\Sigma$ operation unit 93, by $N_2$ which is the number of REs to which signals other than RSs are mapped, to obtain the power $P_2$ which is a power level of an RE to which a signal which is not an RS is mapped. That is, the power P2 which is a power level of an RE to which a signal which is not an RS is mapped is an average of the power levels of a plurality of REs to which signals other than RSs are mapped.

The addition unit 95 is connected to the first $\Sigma$ operation unit 92 and the second $\Sigma$ operation unit 93. The addition unit 95 adds the sum total of the power levels 22 which are power levels of REs to which RSs are mapped, which is outputted from the first $\Sigma$ operation unit 92, and the sum total of the power levels 23 which are power levels of REs to which signals other than RSs are mapped, which is outputted from the second $\Sigma$ operation unit 93, to obtain the measured value of RSSI.

As illustrated in FIG. 11, the RSRQ unit 73 is connected to the RSRP unit 71 and the RSSI unit 72. The RSRQ unit 73 measures RSRQ on the basis of the measured value of RSRP outputted from the RSRP unit 71 and the measured value of RSSI outputted from the RSSI unit 72. The RSRQ unit 73 may, for example, use the measured value of RSRP, the measured value of RSSI, and N which is the number of RBs in the measurement bandwidth to calculate Equation (1) described above, to thereby obtain the measured value of RSRQ. The RSRQ unit 73 is one example of the reception signal quality measuring unit. Note that N which is the number of RBs in the measurement bandwidth is a fixed value and therefore the resulting value of calculation of Equation (1) described above where N is set at 1 may be used as the measured value of RSRQ.

The cell determination unit 74 is connected to the RSSI unit 72 and the RSRQ unit 73. The cell determination unit 74 calculates an offset value $\Delta$ on the basis of the power $P_1$ and the power $P_2$ outputted from the RSSI unit 72. When m consecutive REs to which signals other than RSs are mapped exist between two successive REs to which RSs are mapped, the cell determination unit 74 may calculate Equation (2) below to obtain the offset value $\Delta$, for example.

$$\Delta = 10\log_{10}\frac{(1+m) \times P_1}{P_1 + m \times P_2} \quad (2)$$

In Equation (2) described above, the numerator is the power in the case where there are (m+1) consecutive REs to which RSs are mapped, that is, the power levels of (m+1) REs in the full-load case. The denominator is the sum of the power level of one RE to which an RS is mapped and the power levels of m REs to which signals other than RSs are mapped. Specifically, the denominator represents the actual receiving state. In the full-load case, $\Delta$ is 0 dB. In the DTX case, $\Delta$ is greater than 0 dB.

In an LTE system, for example, five consecutive REs to which signals other than RSs are mapped exist between two successive REs to which RSs are mapped. That is, m is 5 in Equation (2) described above. Therefore, for an LTE system, the cell determination unit 74 may calculate Equation (3) below, for example, to obtain the offset value $\Delta$.

$$\Delta = 10\log_{10}\frac{6 \times P_1}{P_1 + 5 \times P_2} \quad (3)$$

The cell determination unit 74 uses the offset value $\Delta$ to correct the threshold. The cell determination unit 74 may, for example, add the offset value $\Delta$ to the threshold to obtain the corrected threshold. Note that, when the measured value of RSRQ is a value obtained by setting N at 1 in Equation (1) described above, the threshold and the offset value $\Delta$ are values corresponding to the values obtained when N is set at 1 in Equation (1) described above.

The cell determination unit 74 compares the measured value of RSRQ with the corrected threshold and determines whether the cell presumed to correspond to the reception signals is valid or invalid. For example, when the measured value of RSRQ is equal to or greater than the corrected threshold, the cell determination unit 74 may determine that the cell is a valid cell, that is, the cell is present, and when the measured value of RSRQ is less than the corrected threshold, the cell determination unit 74 may determine that the cell is an invalid cell, that is, the cell is not present.

The report value generating unit 75 is connected to the RSRP unit 71, the RSRQ unit 73, and the cell determination unit 74. The report value generating unit 75 generates a report value for reporting the measurement result of the reception power and reception quality to the control unit 63 (see FIG. 10) only for a cell that is determined by the cell determination unit 74 to be present, and performs control for reporting the report value to the control unit 63 (see FIG. 10).

In the level measuring unit 62, the RSRP unit 71, the RSSI unit 72, the RSRQ unit 73, the cell determination unit 74, and the report value generating unit 75 may be implemented by a digital circuit or by processing of a DSP or a CPU. Alternatively, some of the RSRP unit 71, the RSSI unit 72, the RSRQ unit 73, the cell determination unit 74, and the report value generating unit 75 may be implemented by a digital circuit and the remaining ones may be implemented by processing of a DSP or a CPU. For example, the RSRP unit 71, the RSSI unit 72, and the RSRQ unit 73 may be implemented by a digital circuit, and the cell determination unit 74 and the report value generating unit 75 may be implemented by processing of a DSP or a CPU.

Second Example of Cell Determination Method

Figure 14:
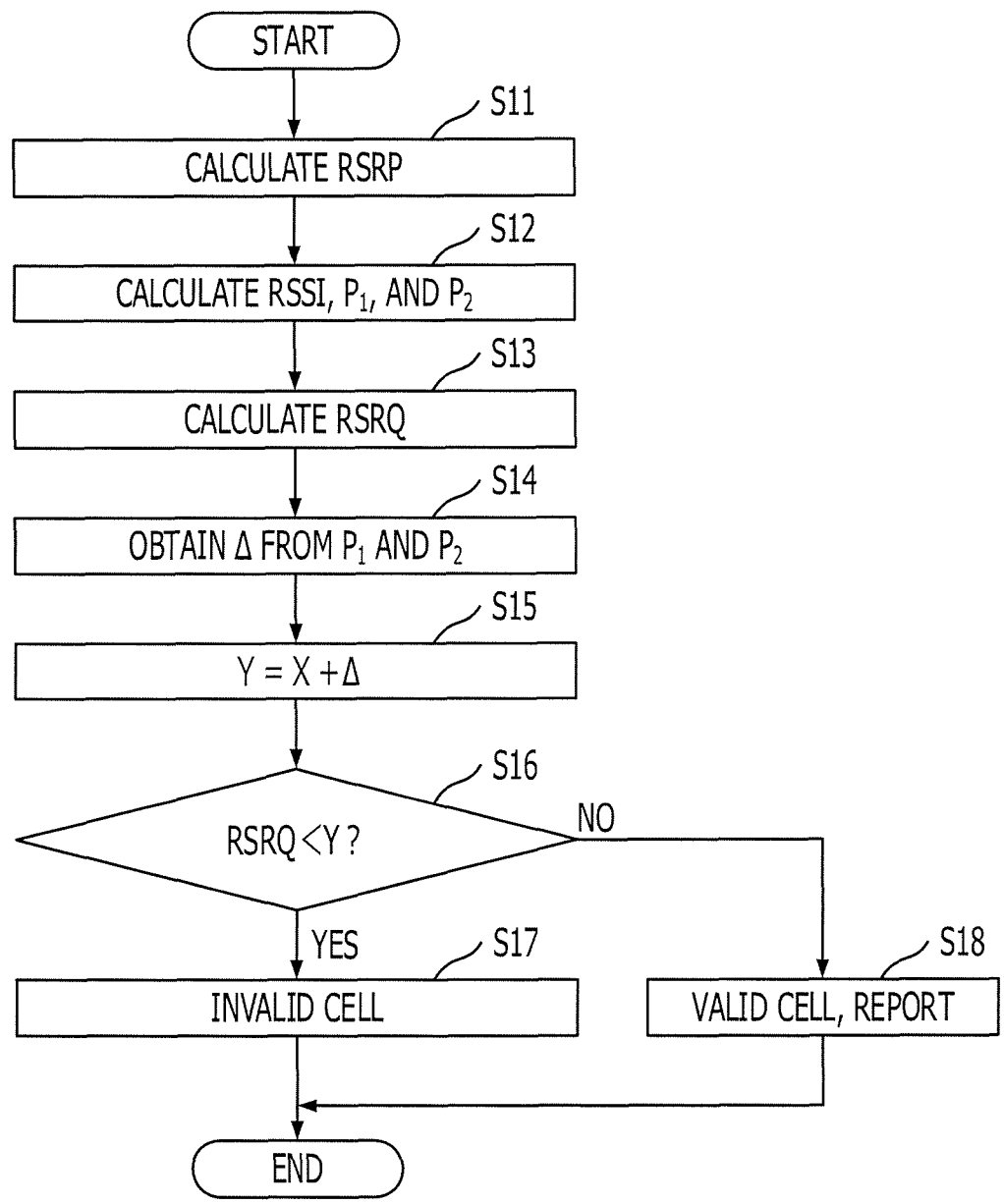
FIG. 14 is a flowchart illustrating a second example of the cell determination method according to an embodiment.

FIG. 14 is a flowchart illustrating a second example of the cell determination method according to an embodiment. The cell determination method illustrated in FIG. 14 may be implemented by the level measuring unit 62 of the mobile communication terminal illustrated in FIG. 11, for example. This embodiment is described below while supposing that the cell determination method illustrated in FIG. 14 is implemented by the level measuring unit 62 of the mobile communication terminal illustrated in FIG. 11.

As illustrated in FIG. 14, when the cell determination method is started by the level measuring unit 62 of the mobile communication terminal illustrated in FIG. 11, the mobile communication terminal first causes the RSRP unit 71 to measure the power levels of REs to which RSs among reception signals are mapped for a cell detected by a cell search and calculate the measured value of RSRP (S11).

The mobile communication terminal causes the RSSI unit 72 to measure the power levels of REs to which the RSs among the reception signals are mapped to calculate the power $P_1$ which is a power level of an RE to which an RS is mapped. The mobile communication terminal also causes the RSSI unit 72 to measure the power levels of REs to which signals other than the RSs among the reception signals are mapped to calculate the power $P_2$ which is a power level of an RE to which a signal which is not an RS is mapped.

The mobile communication terminal causes the RSSI unit 72 to add the power $P_1$ which is a power level of an RE to which an RS is mapped and the power $P_2$ which is a power level of an RE to which a signal which is not an RS is mapped together to obtain the measured value of RSSI (S12). Note that S11 may be executed first, S12 may be executed first, or S11 and S12 may be executed concurrently.

Next, the mobile communication terminal causes the RSRQ unit 73 to use the measured value of RSRP, the measured value of RSSI, and N which is the number of RBs in the measurement bandwidth to calculate Equation (1) described above, for example, to thereby obtain the measured value of RSRQ (S13). Note that N which is the number of RBs in the measurement bandwidth is a fixed value and therefore the resulting value of calculation of Equation (1) described above where N is set at 1 may be used as the measured value of RSRQ.

The mobile communication terminal causes, for example, the cell determination unit 74 to use the power P1 which is a power level of an RE to which an RS is mapped, the power P2 which is a power level of an RE to which a signal which is not an RS is mapped, and m which is the number of REs to which signals other than RSs are mapped to calculate Equation (2) described above, for example, to thereby obtain an offset value Δ (S14).

The mobile communication terminal causes, for example, the cell determination unit 74 to add the offset value Δ to a threshold X to obtain a corrected threshold Y (S15). Note that S13 may be executed first, S14 and S15 may be executed first, or S13 may be executed concurrently with S14 and S15.

The mobile communication terminal causes, for example, the cell determination unit 74 to compare the measured value of RSRQ with the corrected threshold Y and determine whether the measured value of RSRQ is less than the corrected threshold Y (S16). If the measured value of RSRQ is less than the corrected threshold Y (Yes in S16), the mobile communication terminal causes the cell determination unit 74 to determine that the cell detected by the cell search is invalid (S17). The mobile communication terminal does not send a report to the control unit 63 for the invalid cell and the series of processes of the cell determination method is terminated.

On the other hand, if the measured value of RSRQ is not less than the corrected threshold Y (No in S16), the mobile communication terminal causes the cell determination unit 74 to determine that the cell detected by the cell search is valid. The mobile communication terminal causes the report value generating unit 75 to generate a report value and sends a report to the control unit 63 (S18), and the series of processes of the cell determination method is terminated.

The cell determination unit 74 may correct the measured value of RSRQ on the basis of the power $P_1$ which is a power level of an RE to which an RS is mapped and the power $P_2$ which is a power level of an RE to which a signal which is not an RS is mapped, instead of correcting the threshold. The cell determination unit 74 may compare the corrected measured value of RSRQ with the threshold X and determine validity of the cell. The cell determination method in this case is described below as a third example.

Third Example of Cell Determination Method

Figure 15:
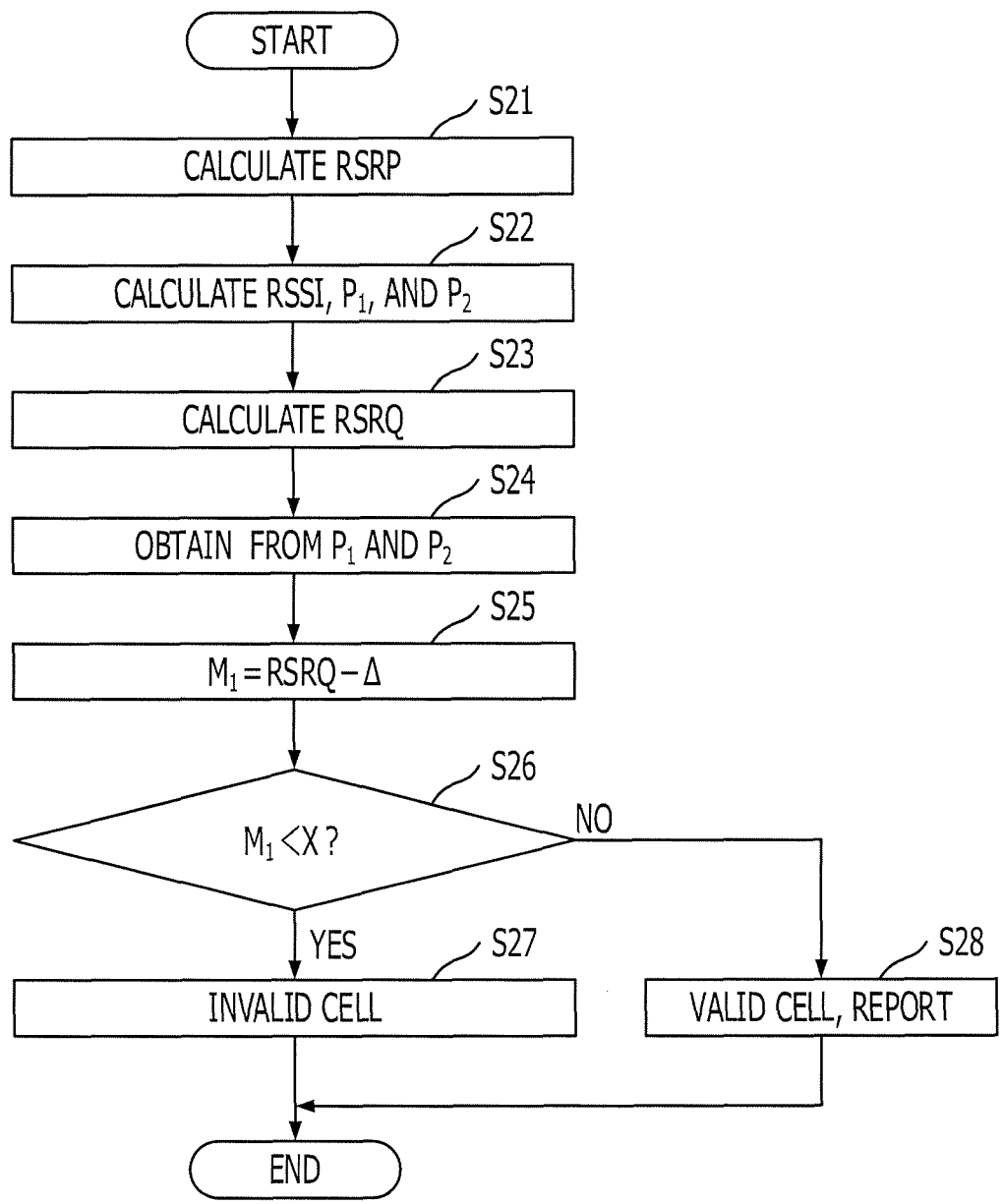
FIG. 15 is a flowchart illustrating a third example of the cell determination method according to an embodiment.

FIG. 15 is a diagram illustrating a third example of the cell determination method according to an embodiment. The cell determination method illustrated in FIG. 15 may be implemented by the level measuring unit 62 of the mobile communication terminal illustrated in FIG. 11, for example. This embodiment is described below while supposing that the cell determination method illustrated in FIG. 15 is implemented by the level measuring unit 62 of the mobile communication terminal illustrated in FIG. 11.

As illustrated in FIG. 15, when the cell determination method is started by the level measuring unit 62 of the mobile communication terminal illustrated in FIG. 11, the mobile communication terminal performs processing similar to S11 to S14 in the cell determination method illustrated in FIG. 14. Specifically, the mobile communication terminal calculates the measured value of RSRP, the power $P_1$ which is a power level of an RE to which an RS is mapped, the power $P_2$ which is a power level of an RE to which a signal which is not an RS is mapped, the measured value of RSSI, the measured value of RSRQ, and the offset value Δ (S21 to S24).

Note that S21 may be executed first, S22 may be executed first, or S21 and S22 may be executed concurrently.

The mobile communication terminal causes, for example, the cell determination unit 74 to subtract the offset value Δ from the measured value of RSRQ, for example, to obtain a metric $M_1$ (S25).

The mobile communication terminal causes, for example, the cell determination unit 74 to compare the metric $M_1$ with the threshold X and determine whether the metric $M_1$ is less than the threshold X (S26). If the metric $M_1$ is less than the threshold X (Yes in S26), the mobile communication terminal causes the cell determination unit 74 to determine that the cell detected by the cell search is invalid (S27). The mobile communication terminal does not send a report to the control unit 63 for the invalid cell and the series of processes of the cell determination method is terminated.

On the other hand, if the metric $M_1$ is not less than the threshold X (No in S26), the mobile communication terminal causes the cell determination unit 74 to determine that the cell detected by the cell search is valid. The mobile communication terminal causes the report value generating unit 75 to generate a report value and send a report to the control unit 63 (S28), and the series of processes of the cell determination method is terminated.

The cell determination unit 74 may use a ratio between the measured value of RSRP and the power P1 which is a power level of an RE to which an RS is mapped instead of using the measured value of RSRQ and determine validity of the cell. Specifically, the cell determination unit 74 may, for example, divide the measured value of RSRP by the power $P_1$ to obtain a metric $M_2$.

The cell determination unit 74 may compare the metric $M_2$ with a threshold Z based on the metric $M_2$ and determine validity of the cell. The RSSI unit 72 in this case is described below as a second example of the RSSI unit 72, and the cell determination method in this case is described below as a fourth example of the cell determination method.

Figure 16:
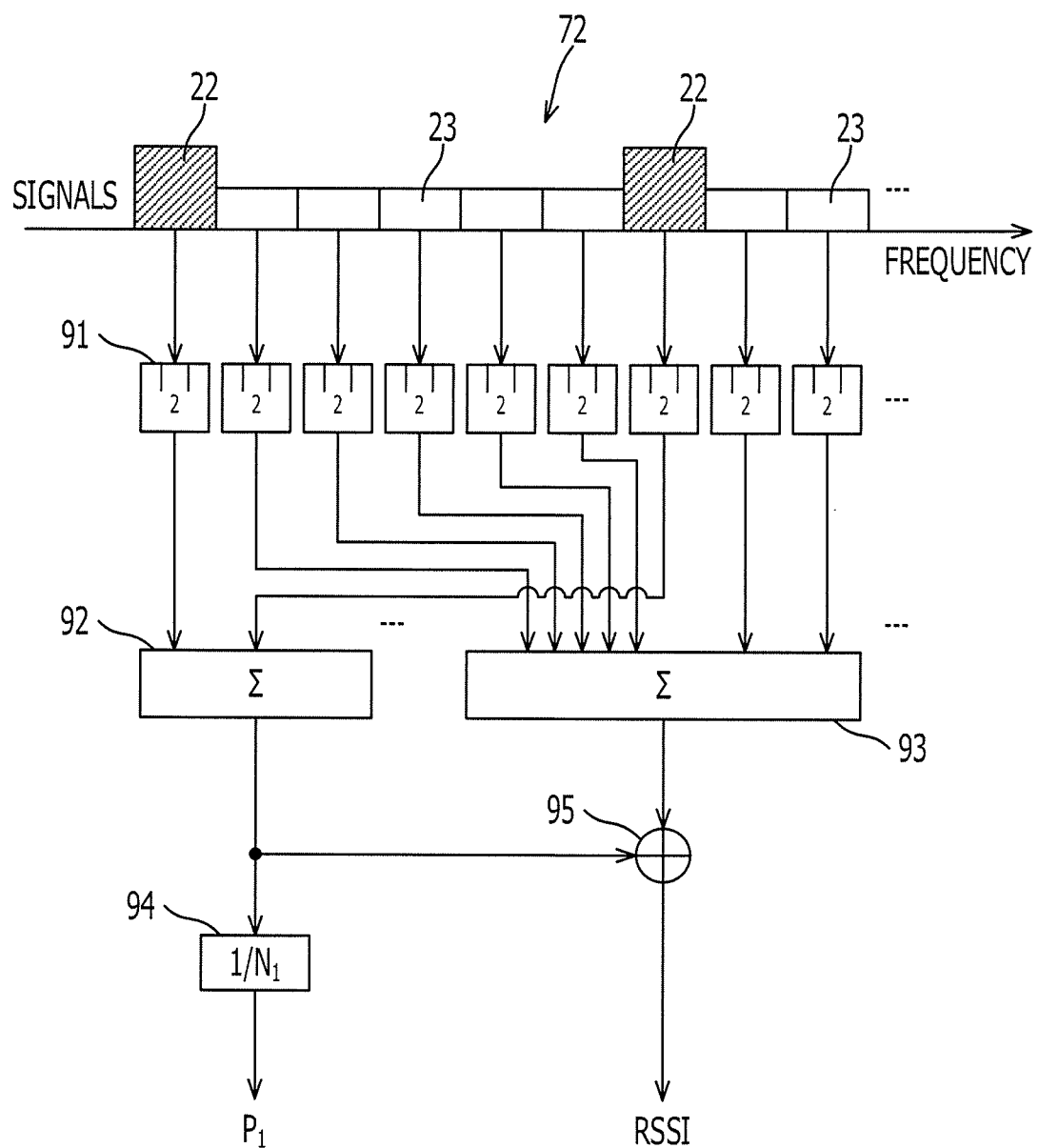
FIG. 16 is a diagram illustrating a second example of the RSSI unit in the mobile communication terminal according to an embodiment.

FIG. 16 is a diagram illustrating a second example of the RSSI unit in the mobile communication terminal according to an embodiment. As illustrated in FIG. 16, in the second example of the RSSI unit 72, the $1/N_2$ operation unit 96 in the first example illustrated in FIG. 13 is not included and therefore the power $P_2$ which is a power level of an RE to which a signal which is not an RS is mapped is not outputted. The other configuration of the RSSI unit 72 in the second example is the same as that in the first example and therefore duplicated description thereof is omitted.

Fourth Example of Cell Determination Method

Figure 17:
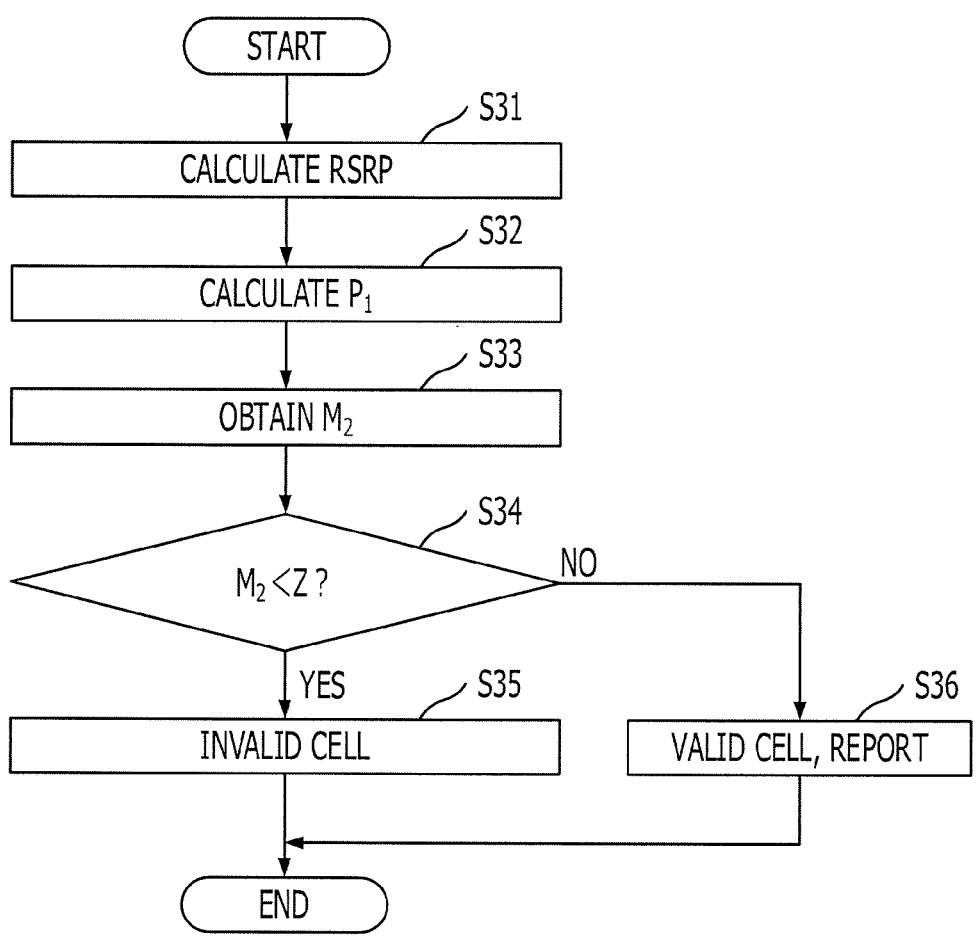
FIG. 17 is a flowchart illustrating a fourth example of the cell determination method according to an embodiment.

FIG. 17 is a diagram illustrating a fourth example of the cell determination method according to an embodiment. The cell determination method illustrated in FIG. 17 may be implemented by the level measuring unit 62 having the RSSI unit 72 illustrated in FIG. 16 in the mobile communication terminal illustrated in FIG. 11, for example. This embodiment is described below while supposing that the cell determination method illustrated in FIG. 17 is implemented by the level measuring unit 62 having the RSSI unit 72 illustrated in FIG. 16 in the mobile communication terminal illustrated in FIG. 11.

As illustrated in FIG. 17, when the cell determination method is started by the level measuring unit 62 of the mobile communication terminal illustrated in FIG. 11, the mobile communication terminal performs processing similar to S11 and S12 in the cell determination method illustrated in FIG. 14. However, the RSSI unit 72 does not have to calculate the power P2 which is a power level of an RE to which a signal which is not an RS is mapped and the measured value of RSSI.

Specifically, the mobile communication terminal calculates the measured value of RSRP (S31) and calculates the power P1 which is a power level of an RE to which an RS is mapped (S32). Note that S31 may be executed first, S32 may be executed first, or S31 and S32 may be executed concurrently.

Next, the mobile communication terminal causes, for example, the cell determination unit 74 to divide, for example, the measured value of RSRP by the power $P_1$ to obtain the metric $M_2$ (S33).

Next, the mobile communication terminal causes, for example, the cell determination unit 74 to compare the metric $M_2$ with a threshold Z and determine whether the metric $M_2$ is less than the threshold Z (S34). If the metric $M_2$ is less than the threshold Z (Yes in S34), the mobile communication terminal causes the cell determination unit 74 to determine that the cell detected by the cell search is invalid (S35). The mobile communication terminal does not send a report to the control unit 63 for the invalid cell and the series of processes of the cell determination method is terminated.

On the other hand, if the metric $M_2$ is not less than the threshold Z (No in S34), the mobile communication terminal causes the cell determination unit 74 to determine that the cell detected by the cell search is valid. The mobile communication terminal causes the report value generating unit 75 to generate a report value and send a report to the control unit 63 (S36), and the series of processes of the cell determination method is terminated.

In the mobile communication terminal illustrated in FIGS. 9 to 13 or FIG. 16, or in the cell determination method illustrated in FIG. 14, 15, or 17, false determination of a cell that is not present to be a valid cell is suppressed in an LTE system. Accordingly, reporting of the measurement result of the reception quality relating to a cell that is not present to a base station is suppressed. As a result, wasteful use of radio resources of the uplink is reduced. Furthermore, in the mobile communication terminal illustrated in FIG. 16 or in the cell determination method illustrated in FIG. 17, the power $P_2$ which is a power level of an RE to which a signal which is not an RS is mapped in the DTX case is not taken into consideration and therefore the same threshold Z may be used in both the full-load case and the DTX case.

In the mobile communication terminal illustrated in FIGS. 9 to 13, for the case where the cell determination method illustrated in FIG. 14 is implemented and for the case where the measured value of RSRQ is compared with the threshold X without correcting the threshold X, evaluation by computer simulation was performed. The results are described below in which the case where the cell determination method illustrated in FIG. 14 is implemented is referred to as an "example", while the case where the measured value of RSRQ is compared with the threshold X is referred to as a "comparative example".

In the full-load case, the probability of determining a cell that is not present to be a valid cell was 0% for both the comparative example and the example. In the DTX case, the probability of determining a cell that is not present to be a valid cell was 66.3% for the comparative example and 0% for the example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication apparatus comprising:
an antenna configured to receive reception signals including pilot signals from a cell detected by a cell search, the pilot signals including a first pilot signal, the reception signals being configured to correspond to radio resources to which channels are mapped; and
a processor coupled to the antenna and configured to:
measure power of the reception signals, power of the pilot signals, power of a first subcarrier to which the first pilot signal is mapped, and power of a second subcarrier to which a signal other than the pilot signals is mapped;
measure a signal quality of the reception signals based on the measured power of the reception signals and the measured power of the pilot signals;
modify either a threshold or a value of the measured signal quality of the reception signals, based on the measured power of the first subcarrier, and the measured power of the second subcarrier, and a number of second subcarriers mapped between two successive first subcarriers;
based on the modified threshold or the modified value of the measured signal quality of the reception signals, determine whether to transmit a measurement report; and transmit a measurement report when it is determined that the measurement report is to be transmitted.

2. The radio communication apparatus of claim 1, wherein the processor is further configured to:
when the value of the measured signal quality of the reception signals is modified, based on the measured power of the reception signals and the measured power of the pilot signals,
compare the modified value of the measured signal quality of the reception signals with the threshold; and
determine whether the cell detected by the cell search is valid based on the comparison.

3. The radio communication apparatus according to claim 2, wherein the processor is further configured to:
obtain a level of usage of radio resources to which the channels are mapped, and
decrease the value of the measured signal quality of the reception signals when the level indicates fewer of the radio resources than specified radio resources are used.

4. The radio communication apparatus according to claim 2, wherein the processor is further configured to transmit the measurement report when the measured signal quality of the reception signals is better than a specified quality.

5. The radio communication apparatus according to claim 4, wherein the processor is further configured to:
obtain a level of usage of radio resources to which the channels are mapped, and
adjust the value of the measured signal quality of the reception signals by decreasing the specified quality when the level indicates that more of the radio resources than specified radio resources are used.

6. The radio communication apparatus according to claim 4, wherein the processor is further configured to:
obtain a level of usage of radio resources to which the channels are mapped, and
adjust the value of the measured signal quality of the reception signals by increasing the specified quality when the level indicates that fewer of the radio resources than specified radio resources are used.

7. The radio communication apparatus according to claim 2,
wherein the processor is further configured to acquire a level of usage of radio resource to which the channels are mapped, and
wherein the level comprises a reception power of signals other than pilot signals.

8. The radio communication apparatus according to claim 1, wherein the processor is further configured to adjust the measured signal quality of the reception signals further in accordance with a power of the pilot signals.

9. The radio communication apparatus according to claim 1, wherein the measured signal quality of the reception signals comprises Reference Signal Received Quality (RSRQ).

10. The radio communication apparatus according to claim 1, wherein the channels comprises a data channel and a control channel.

11. The radio communication apparatus according to claim 1, wherein the measurement report is used in determining a target apparatus for handover of the radio communication apparatus, by the base station which is a destination of the measurement report.

12. A radio communication system, comprising:
a first radio communication apparatus including an antenna configured to receive reception signals comprising pilot signals from a cell detected by a cell search, the reception signals being configured to correspond to radio resources to which channels are mapped; and
a second radio communication apparatus coupled to the first radio communication apparatus,
wherein the first radio communication apparatus is configured to:
measure power of the reception signals, power of the pilot signals, power of a first subcarrier to which the first pilot signal is mapped, and power of a second subcarrier to which a signal other than the pilot signals is mapped,
measure a signal quality of the reception signals based on the measured power of the reception signals and the measured power of the pilot signals,
modify either a threshold or a value of the measured signal quality of the reception signals, based on the measured power of the first subcarrier, and the measured power of the second subcarrier and a number of second subcarriers mapped between two successive first subcarriers,
based on the modified threshold or the modified value of the measured signal quality of the reception signals, determine whether to transmit a measurement report, and
transmit a measurement report to a second radio communication apparatus when it is determined that the measurement report is to be transmitted; and
wherein the second radio communication apparatus is configured to receive the measurement report, and to determine a target apparatus for handover of the first radio communication apparatus in accordance with the measurement report.

13. A radio communication method for a radio communication apparatus, the radio communication method comprising:
receiving, at the radio communication apparatus, reception signals including pilot signals from a cell detected by a cell search, the reception signals being configured to correspond to radio resources to which channels are mapped;
measuring power of the reception signals, power of the pilot signals, power of a first subcarrier to which the first pilot signal is mapped, and power of a second subcarrier to which a signal other than the pilot signals is mapped;
measuring a signal quality of the reception signals based on the measured power of the reception signals and the measured power of the pilot signals;
modifying either a threshold or a value of the measured signal quality of the reception signals, based on the measured power of the first subcarrier, and the measured power of the second subcarrier and a number of second subcarriers mapped between two successive first subcarriers;
based on the modified threshold or the modified value of the measured signal quality of the reception signals, determining whether to transmit a measurement report; and
transmitting a measurement report when it is determined that the measurement report is to be transmitted.

14. The radio communication apparatus of claim 1, wherein the processor is further configured to:
when the threshold is modified, based on the measured power of the reception signals and the measured power of the pilot signals, compare the measured signal quality of the reception signals with the modified threshold; and determine whether the cell detected by the cell search is valid based on the comparison.

15. The radio communication apparatus according to claim 2, wherein the processor is further configured to:

acquire a level of usage of radio resources to which the channels are mapped, and increase the value of the measured signal quality of the reception signals when the level indicates more of the radio resources than specified radio resources are used.

16. The radio communication apparatus according to claim 14, wherein the processor is further configured to, when the measured signal quality of the reception signals is greater than the threshold, determine that the cell detected by the cell search is valid; or when the measured signal quality of the reception signals is not greater than the threshold, determine that the cell detected by the cell search is invalid.

17. The radio communication apparatus according to claim 15, wherein the processor is further configured to measure power of first subcarriers in which the pilot signals are received, and power of second subcarriers in which signals other than the pilot signals are received, the power of second subcarriers being configured to indicate a level of usage of the second subcarriers.

18. The radio communication apparatus according to claim 17, wherein the processor is further configured to increase the measured signal quality of the reception signals when the level of usage of the second subcarriers indicates that more radio resources are used than specified radio resources.

19. The radio communication apparatus according to claim 18, wherein the processor is further configured to modify the threshold based on the measured power of the first subcarriers and the measured power of the second subcarriers.

20. The radio communication apparatus according to claim 14, wherein the pilot signals comprise one or more reference signals.

21. The radio communication apparatus according to claim 1, wherein the measurement report is configured to include information indicating the measured signal quality of the reception signals.

22. The radio communication apparatus according to claim 1, wherein the processor is further configured to transmit the measurement report to a base station.

23. The radio communication apparatus according to claim 14, wherein when the measured signal quality of the reception signals is less than the modified threshold, the processor is further configured to not transmit the measurement report.

24. The radio communication apparatus according to claim 15, wherein when the modified value of the measured signal quality of the reception signals is less than the threshold, the processor is further configured to not transmit the measurement report.

25. The radio communication apparatus according to claim 1, wherein the processor is further configured to transmit the measurement report for the cell to a base station only when it is determined that the cell detected by the cell search is valid.

26. The radio communication apparatus according to claim 1, wherein the processor is further configured to modify the threshold or the value by an offset $\Delta$ obtained in accordance with the following expression:

$$\Delta=10 \log_{10}\{(1+m)\times P_1\}/\{P_1+m\times P_2\},$$

where $P_1$ represents the power of the first subcarrier to which a pilot signal is mapped, P2 represents the power of the second subcarrier to which a signal other than the pilot signal is mapped, m represents a number of second subcarriers mapped between two successive first subcarriers, and x represents a multiplication operation.

27. A radio communication apparatus comprising:

an antenna configured to receive a reception signal including a plurality of subcarriers, the plurality of subcarriers including first subcarriers and second subcarriers, a pilot signal being mapped in each of the first subcarriers, and a first signal other than the pilot signal being mapped in each of the second subcarriers; and a processor coupled to the antenna and configured to:

measure a first signal quality of the reception signal based on power of the reception signal, determine a second signal quality of the reception signal based on the first signal quality and an offset value, the offset value being determined based on at least a ratio of power of the first subcarriers and power of the second subcarriers, and transmit a measurement report when it is determined that based on the second signal quality of the reception signal, the measurement report is to be transmitted.

28. The radio communication apparatus according to claim 27, wherein the processor is further configured to measure the power of the first subcarrier and the power of the second subcarrier.

29. The radio communication apparatus according to claim 28, wherein the offset value is obtained in accordance with the following expression:

$$\Delta=10 \log_{10}\{(1+m)\times P_1\}/\{P_1+m\times P_2\}$$

where $\Delta$ represents the offset value, $P_1$ represents the power of the first subcarrier, $P_2$ represents the power of the second subcarrier, and m represents a number of second subcarriers mapped between two successive first subcarriers.

30. The radio communication apparatus of claim 27, wherein the processor is further configured to modify a threshold for cell determination by adding the offset value to the threshold.

* * * * *